C. H. ARNOLD.
OPERATING DEVICE FOR CAMERAS.
APPLICATION FILED NOV. 13, 1919.
1,358,919.
Patented Nov. 16, 1920.
2 SHEETS—SHEET 1.
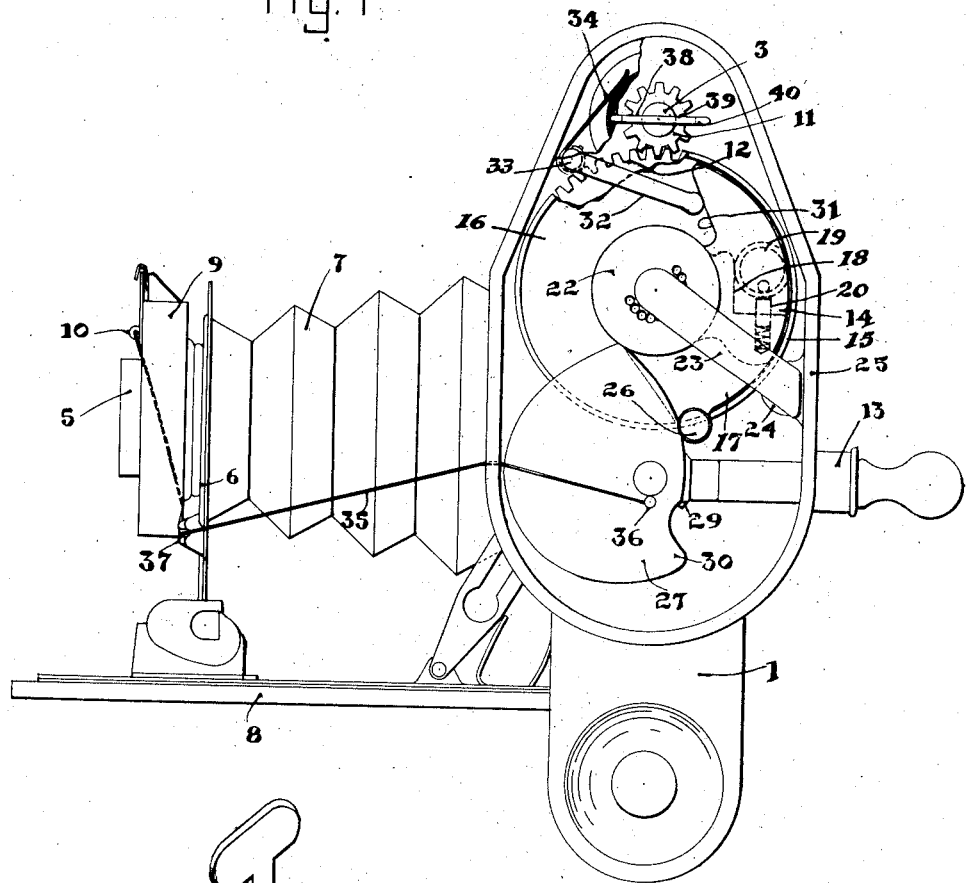
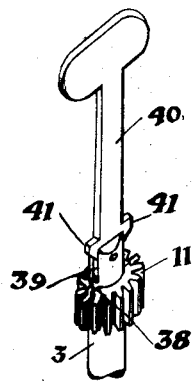
Inventor
Charles H. Arnold
By Edward Read
Attorney

C. H. ARNOLD.
OPERATING DEVICE FOR CAMERAS.
APPLICATION FILED NOV. 13, 1919.

1,358,919.

Patented Nov. 16, 1920.

2 SHEETS—SHEET 2.

Inventor
Charles H. Arnold

By
Attorney

UNITED STATES PATENT OFFICE.

CHARLES H. ARNOLD, OF DAYTON, OHIO, ASSIGNOR TO THE VENUGRAPH COMPANY, OF DAYTON, OHIO, A CORPORATION OF OHIO.

OPERATING DEVICE FOR CAMERAS.

1,358,919.  Specification of Letters Patent.  Patented Nov. 16, 1920.

Application filed November 13, 1919. Serial No. 337,688.

*To all whom it may concern:*

Be it known that I, CHARLES H. ARNOLD, a citizen of the United States, residing at Dayton, in the county of Montgomery and State of Ohio, have invented certain new and useful Improvements in Operating Devices for Cameras, of which the following is a specification, reference being had therein to the accompanying drawing.

This invention relates to an operating device for cameras, and is designed more particularly for use on the ordinary hand operated film camera.

The object of the invention is to provide a device by means of which a film camera may be operated to cause a series of exposures to be made in rapid succession upon the film strip.

A further object of the invention is to provide such a device which will be simple in its construction and positive in its operation; and further, to provide such a device which can be applied to an ordinary camera without material modification thereof.

Other objects of the invention will appear as the mechanism is described in detail.

Figure 2:
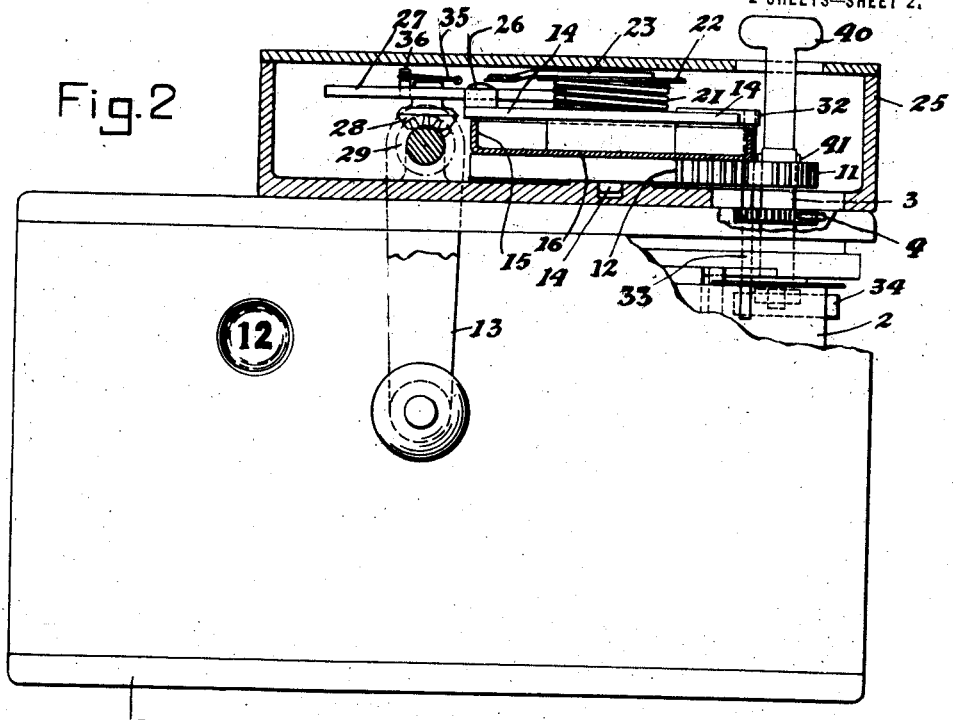
Figure 3:
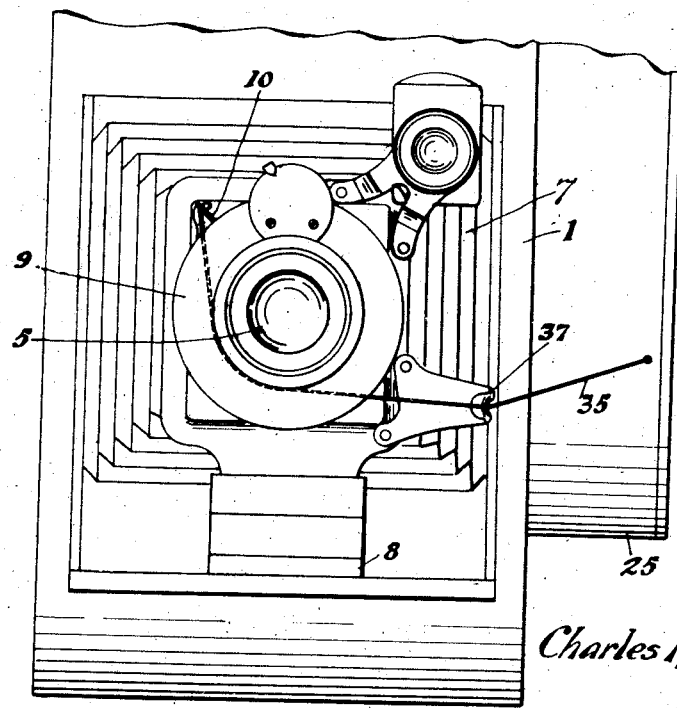

In the accompanying drawings Figure 1 is a plan view, partly broken away, of a camera embodying my invention; Fig. 2 is a rear elevation, partly in section, of such a device; Fig. 3 is a front elevation of a camera with the operating device applied thereto and partly broken away; and Fig. 4 is a detail view of the finger piece and pinion.

In these drawings I have illustrated one embodiment of my invention and have shown the same as applied to an ordinary folding camera of that type employing a roll of film. It will be understood, however, that this particular type of camera has been chosen for the purpose of illustration only, and that the invention may be applied to cameras of various kinds, and that the mechanism may take various forms without departing from the spirit of my invention.

As here shown, the camera comprises a casing 1, having at one end thereof means for supporting the rewinding roller 2, by means of which the film is fed from one side of the camera to the other and on which the film is stored until the complete strip has been exposed. The rewinding roller 2 is removably mounted in the camera, and to this end the latter is provided with a shaft 3, which is mounted in the ends of the casing and has means for detachably securing the same to the roller 2 so that the latter will rotate therewith when the shaft is rotated, the shaft being provided with a finger piece by means of which it may be rotated. A suitable detent pawl 4 is provided to prevent the roll from being rotated in a reverse direction. The camera is provided with the usual lens 5, which is mounted upon a supporting structure 6, and is connected with the camera casing by means of a bellows 7, the supporting structure being slidably mounted upon the hinged front 8 of the camera. Mounted within a casing 9 upon the supporting structure 6 is a suitable shutter, which is not here shown, but which is provided with a controlling device, such as a lever 10, by means of which the shutter may be caused to operate. The camera construction which has been described is of a well known type and forms no part of my invention except in so far as it enters into combination with the operating mechanism which I have provided.

In order to enable a series of exposures to be made upon the film in rapid succession I have provided an operating device so connected with the rewinding roller that it will impart intermittent movement thereto, thus causing the film to be fed across the camera step by step, and I have so connected this operating member with the shutter controlling device that the shutter will be caused to operate during the intervals between successive movements of the film, thereby enabling the exposure to be made while the film is stationary. In the particular embodiment of the invention here illustrated I have mounted on the shaft 3 of the rewinding roller a pinion 11, which meshes with a gear 12 rotatably mounted on one edge of the casing. This gear is so operated that it will impart intermittent rotatory movement to the pinion and to the rewinding roller, and to this end it is connected with a suitable operating member, such as a crank 13, which preferably rotates continuously in one direction, by mechanism which will convert the continuous rotatory movement of the crank, or operating member, into intermittent rotatory movement as applied to the rewinding roller. The gear 12 preferably rotates in one direction only, and intermittent movement is imparted thereto by means of an actuating plate 14 mounted for oscillating movement about the axis of the gear, and which is connected thereto by a suitable clutch connection which will cause the gear to move with the oscillating plate when the latter moves in one direction but will permit the plate to move in the opposite direction independently of the gear. The plate may be clutched to the gear in any suitable manner, but in the present instance I have provided the gear with an angular flange 15 extending parallel with the edge of the gear, and in the present instance formed on a plate 16, which is rigidly secured to the face of the gear, and arranged concentric with the axis of the gear. The oscillating plate 14 has a radius substantially equal to the radius of the angular flange and has secured thereto and movable therewith a second plate 17 which is interposed between the oscillating plate 14 and the gear and has its outer edge, adjacent to the flange 15, provided with a tapered recess 18, in which is mounted a roller, 19, of such a size that it cannot pass between the edge of the recess and the flange 15. A spring pressed plunger 20 mounted at the larger end of the tapered recess tends to move the roller into contact with the flange and tapered end of the recess. Consequently, when the oscillating plate is moved in one direction, the roller will be caused to grip the flange 15 and the edge of the recess 18 and thus rigidly connect these parts one with the other so that the gear will rotate with the oscillating plate. When the plate is rotated in the opposite direction the contact of the roller with the flange 15 will tend to move the same toward the larger end of the recess 18, thus disconnecting the flange from the plate 17 and permitting the oscillating plate to move in the return direction independently of the flange and of the gear. Oscillating movement may be imparted to the plate 14 from the operating member, or crank, 13, in any suitable manner. In the present construction the plate 14 is moved in one direction by means of a spring 21 which is coiled about the axis of the plate and is connected at one end with the plate and at the other end with a disk 22 which is held against rotation by means of a bar 23 extending between the same and the fixed part of the structure. In the present instance the outer end of the bar is secured to a lug 24 extending inwardly from a casing 25 which incloses the several parts of the mechanism. The oscillating plate has secured thereto a stud, 26, which is preferably provided with a roller, and is arranged to be engaged by a cam 27 mounted for rotation within the casing 25 and connected with the operating member, or crank, 13, by means of miter gears 28 and 29. This cam has a nose 30 adapted to engage the stud 26 and impart initial movement to the oscillating plate, and after the nose has passed the stud the edge of the cam will engage the stud and continue the movement of the plate, that portion of the cam adjacent to the nose 30 having a gradually increasing radius. As here shown, the cam is also provided with a concentric portion which holds the oscillating plate 14, and consequently the film, in a stationary position for an interval and then releases the plate to permit the latter to return to its normal position under the influence of the spring 21. The exposure may be made either while the plate is held against movement by the concentric portion of the cam or during the return movement of the oscillating plate, as the film is stationary during this return movement.

Inasmuch as the film is fed forward by the rewinding roller and the effective diameter of this roller increases as the film is wound thereon it will be apparent that the length of film advanced will increase with each successive complete rotation of the rewinding roller. It is desirable, therefore, that some means be provided to control the feeding of the film and cause substantially equal lengths thereof to be advanced upon each operation of the rewinding roller. To this end I have provided means controlled by the effective diameter of the rewinding roller to limit the return movement of the oscillating plate, and to shorten the return movement of this plate upon each operation thereof, thereby decreasing the operative length of the gear segment which actuates the pinion 11. As here shown, the oscillating plate 14 has an inclined portion 31 adapted to engage one end of a pivoted arm 32 which is carried by a pin, or shaft, 33, extending through the bottom of the casing 25 and through the edge of the camera casing and having secured thereto and bearing against the rewinding roller, an arm 34. As the diameter of the rewinding roller increases, because of the winding of the film thereon, the arm 34 will be moved about its axis and will carry with it the arm 32, thus causing this arm to engage the inclined edge 31 of the oscillating plate 14 in a different position upon each return movement of that plate, thereby shortening the return movement upon each operation. Any suitable means may be provided for causing the shutter to be operated upon each complete operation of the operating member, that is, for causing the shutter to open and close each time a fresh section of the film is moved into position to receive an exposure. In the present construction I have, for the purpose of illustration, shown the cam 27 as connected with the shutter controlling member, or lever, 10, by means of a flexible cord or wire, 35, which is secured to a pin 36 in the face of the cam and extends over a suitable guide 37 and about the edge of the shutter casing 9 to the lever 10. The length of this wire is so adjusted and the pin 36 is so arranged that the lever 10 will be actuated after the feeding movement of the film has been completed. Cameras of this type are frequently provided both with a shutter controlling lever, such as that shown at 10, and with another shutter operating device arranged in the casing 10 and actuated either by an air bulb or by a flexible push rod, and it will be obvious that the operating member 13 may act upon either, or any such, shutter controlling device; and further, that the shutter controlling device need not be directly connected with the operating member, but may be controlled from any part of the mechanism which is actuated by that member.

In order that the rewinding roller may be operated independently of the special operating mechanism here shown, to enable the initial winding of the film to be made thereon when the film is placed in position in the camera, and also to permit the camera to be operated in the usual manner for single exposures, I have detachably connected the pinion 11 with the shaft 3 so that the latter can be rotated by hand. To this end the pinion is loosely mounted on the end of the shaft and is provided in its upper edge with notches 38, and the end of the shaft 3 is slotted as shown at 39 to receive the lower end of a flat key, or finger piece, 40, which is preferably secured within the slot 39 and has laterally extending parts 41 adapted to be moved into and out of the notches in the pinion 11 to connect the same with or to disconnect the same from the shaft. As has been stated, the shaft 3 is capable of longitudinal movement to connect the same with and to disconnect the same from the rewinding roller 2. The arrangement of the projections 41 on the key 40 is such that they may be moved out of the notches in the pinion without disconnecting the shaft from the roller 2, thus permitting the roller to be rotated by the key. A further outward movement of the key will withdraw the shaft a distance sufficient to disconnect the same from the roller, thereby permitting the latter to be removed and a new roller substituted therefor.

The operation of the device may be readily understood from the foregoing description, and it will be apparent that by the continuous rotation of the crank the film will be fed forward step by step, and that at the end of each feeding movement of the film the shutter will be opened to cause an exposure to be made thereon. The mechanism can be operated very rapidly and a series of pictures of a moving object can thus be made.

If desired, the length of feed of film may be varied and the size of the picture correspondingly reduced, enabling a greater number of pictures to be made on a standard roll of film.

The device is very simple in its construction and positive in its operation. Further, it will be apparent that it can be applied to an ordinary camera with very little modification or alteration of the camera.

While I have shown and described one embodiment of my invention, I wish it to be understood that I do not desire to be limited to the details thereof, as various modifications may occur to a person skilled in the art.

Having now fully described my invention, what I claim as new and desire to secure by Letters Patent, is:

1. The combination with a camera comprising a rewinding roller to feed a strip of film from one side of the camera to the other, of an operating member, means actuated by said operating member to impart intermittent movement to said rewinding roller to advance the film step by step, and means to disconnect said rewinding roller from said operating member and to actuate the same independently of said operating member.

2. The combination with a camera comprising a rewinding roller to feed a strip of film from one side of the camera to the other, and a shutter controlling device, of an operating member, means actuated by said operating member to impart intermittent movement to said rewinding roller to advance the film step by step, and means to disconnect said rewinding roller from said operating member and to actuate the same independently of said operating member, and means controlled by said operating member to actuate said shutter controlling device.

3. The combination with a camera comprising a rewinding roller to feed a strip of film from one side of the camera to the other, and a shutter controlling device, of an operating member, a pinion connected with said rewinding roller, means interposed between said operating member and said pinion to impart intermittent movement to said rewinding roller, said means being controlled by the winding of the film on said roller to cause said roller to advance the film substantially equal distances upon each movement thereof, and means controlled by said operating member to actuate said shutter controlling device.

4. The combination with a camera comprising a rewinding roller to feed a strip of film from one side of the camera to the other, and a shutter controlling device, of an operating member, means interposed between said rewinding roller and said operating member to impart intermittent winding movement to the former, a member controlled by the winding of the film on said roller to cause each successive movement of said roller to be less than the preceding movement thereof, and means to cause said shutter controlling device to be actuated in timed relation to the movements of said rewinding roller.

5. The combination with a camera comprising a rewinding roller to feed a strip of film from one side of the camera to the other, and a shutter controlling device, of an operating member, a pinion connected with said rewinding roller, means interposed between said operating member and said pinion to impart intermittent movement to said rewinding roller, a member controlled by the winding of the film on said roller to cause each successive movement of the roller to be less than the preceding movement thereof, and means controlled by said operating member to actuate said shutter controlling device.

6. The combination with a camera comprising a rewinding roller to feed a strip of film from one side of the camera to the other, of a pinion connected with said rewinding roller, a gear meshed with said pinion, means for intermittently actuating said gear, and means controlled by the film on said rewinding roller to reduce the amount of movement imparted to said gear upon successive operations thereof.

7. The combination with a camera comprising a rewinding roller to feed a strip of film from one side of the camera to the other, of a pinion connected with said rewinding roller, a gear meshing with said pinion, means for intermittently actuating said gear, and an automatically adjustable stop to reduce the movement imparted to said gear upon the successive operations thereof.

8. The combination with a camera comprising a rewinding roller to feed a strip of film from one side of the camera to the other, and a shutter controlling device, of an operating member, and cam operated means connected with said operating member to impart intermittent rotatory movement to said rewinding roller and to cause said shutter controlling device to be actuated.

9. The combination with a camera comprising a rewinding roller to feed a strip of film from one side of the camera to the other, and a shutter controlling device, of an operating member, an oscillating member connected with said rewinding roller to impart intermittent movement thereto, an operative connection between said oscillatory member and said operating member, and means controlled by said operating member to cause said shutter controlling device to be actuated.

10. The combination with a camera comprising a rewinding roller to feed a strip of film from one side of the camera to the other, and a shutter controlling device, of an operating member, an oscillatory member operatively connected with said rewinding roller to impart intermittent movement thereto, a cam connected with said operating member and acting on said oscillatory member to impart oscillatory movement thereto, and means controlled by said operating member to cause said shutter controlling device to be actuated.

11. The combination with a camera comprising a rewinding roller to feed a strip of film from one side of the camera to the other, and a shutter controlling device, of an operating member, an oscillating member operatively connected with said rewinding roller to impart intermittent movement thereto, an operative connection between said oscillating member and said operating member, adjustable means for limiting the movement of the oscillating member in one direction, and means controlled by said operating member for causing said shutter controlling device to be actuated.

12. The combination with a camera comprising a rewinding roller to feed a strip of film from one side of the camera to the other, of an operating member, an oscillating member having operative connection with said rewinding roller to impart intermittent movement thereto, an operative connection between said oscillating member and said operating member, said oscillating member having one edge inclined, a pivoted finger having one end arranged in the path of the inclined edge of said oscillating member, and a part rigidly connected with said finger and bearing against the surface of the rewinding roller to adjust said finger to different positions with relation to said inclined edge of said oscillating member.

13. The combination with a camera comprising a rewinding roller to feed a strip of film from one side of the camera to the other, of an operating member, a pinion connected with said rewinding roller, a gear meshing with said pinion, and cam operated means connected with said operating member to impart intermittent movement to said gear.

14. The combination with a camera comprising a rewinding roller to feed a strip of film from one side of the camera to the other, and a shutter controlling device, of an operating member, a pinion connected with said rewinding roller, a gear meshing with said pinion, cam operated means connected with said operating member to impart intermittent movement to said gear, and means controlled by said cam to actuate said shutter controlling device.

15. The combination with a camera comprising a rewinding roller to feed a strip of film from one side of the camera to the other, of an operating member, a pinion connected with said rewinding roller, a gear meshing with said pinion, an oscillating member, a clutch connection between said oscillating member and said gear, and an operative connection between said operating member and said oscillatory member.

16. The combination with a camera comprising a rewinding roller to feed a strip of film from one side of the camera to the other, of an operating member, a pinion connected with said rewinding roller, a gear meshing with said pinion, a flange carried by said gear, an oscillating member having movement about the axis of said gear, a roller clutch connected with said oscillating member and acting on said flange to connect the gear with the oscillating member when the latter moves in one direction, and an operative connection between said operating member and said oscillating member.

17. The combination with a camera comprising a rewinding roller to feed a strip of film from one side of the camera to the other, of an operating member, a pinion connected with said rewinding roller, a gear meshing with said pinion, an oscillating member having a clutch connection with said gear, a spring to move said oscillating member in one direction, and means actuated by said operating member to move said oscillating member in the opposite direction.

18. The combination with a camera comprising a rewinding roller to feed a strip of film from one side of the camera to the other, of an operating member, a pinion connected with said rewinding roller, a gear meshing with said pinion, an oscillating member having a clutch connection with said gear, a spring to move said oscillating member in one direction, and a cam connected with said operating member and acting on said oscillating member to move the same against the tension of said spring.

19. The combination with a camera comprising a rewinding roller to feed a strip of film from one side of the camera to the other, of an operating member, a pinion connected with said rewinding roller, a gear meshing with said pinion, an oscillating member having a clutch connection with said gear, means actuated by said operating member to move said oscillating member in a direction to rotate said gear, a spring to impart return movement to said oscillating member, and means to limit the said return movement of said oscillating member according to the diameter of said rewinding roller.

20. The combination with a camera comprising a rewinding roller to feed a strip of film from one side of the camera to the other, and a shutter controlling device, of an operating member, a cam connected with said operating member, and means controlled by said cam for imparting rotatory movement to said rewinding roller, and a flexible member connecting said cam with said shutter controlling device.

21. The combination with a camera comprising a rewinding roller to feed a strip of film from one side of the camera to the other, of an operating member, a pinion loosely connected with said rewinding roller, means for connecting said pinion with or disconnecting same from said rewinding roller, a gear meshing with said pinion, an operative connection between said operating member and said gear, and means for actuating said rewinding roller when said pinion is disconnected therefrom.

22. The combination with a camera comprising a rewinding roller to feed a strip of film from one side of the camera to the other, of a shaft connected with said rewinding roller, a pinion loosely mounted on said shaft, a key mounted on said shaft for axial movement relatively to said pinion and adapted to connect said pinion with said shaft, a gear meshing with said pinion, and an operating member operatively connected with said gear.

23. The combination with a camera comprising a rewinding roller to feed a strip of film from one side of the camera to the other, of a shaft adapted to be connected with said rewinding roller and capable of longitudinal movement, a pinion loosely mounted on said shaft and having notches in one face thereof, said shaft having a slotted end portion, a key mounted in said slotted end portion of said shaft and secured thereto, and having laterally extended portions adapted to enter the notches of said pinion, a gear meshing with said pinion, and an operating member operatively connected with said gear.

In testimony whereof I affix my signature hereto.

CHARLES H. ARNOLD.